(12) United States Patent
Lee et al.

(10) Patent No.: US 12,026,376 B2
(45) Date of Patent: Jul. 2, 2024

(54) METHOD FOR PRESERVING DATA IN ELECTRONIC DEVICE INITIALIZATION SITUATION AND ELECTRONIC DEVICE THEREFOR

(71) Applicant: Samsung Electronics Co., Ltd., Suwon-si (KR)

(72) Inventors: Eunsung Lee, Suwon-si (KR); Changhoon Shin, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 45 days.

(21) Appl. No.: 17/953,756

(22) Filed: Sep. 27, 2022

(65) Prior Publication Data

US 2023/0145690 A1 May 11, 2023

Related U.S. Application Data

(63) Continuation of application No. PCT/KR2022/014048, filed on Sep. 20, 2022.

(30) Foreign Application Priority Data

Nov. 10, 2021 (KR) ........................ 10-2021-0153906
Dec. 27, 2021 (KR) ........................ 10-2021-0188159

(51) Int. Cl.
G06F 3/06 (2006.01)
(52) U.S. Cl.
CPC .......... *G06F 3/0619* (2013.01); *G06F 3/0652* (2013.01); *G06F 3/0679* (2013.01)

(58) Field of Classification Search
CPC ... G06F 11/1446–1458; G06F 11/1402; G06F 11/1415; G06F 11/1469; G06F 3/06
See application file for complete search history.

(56) References Cited

U.S. PATENT DOCUMENTS

| 6,505,306 | B1 | 1/2003 | Blackmon et al. |
| 10,387,054 | B2 | 8/2019 | Del Giudice et al. |
| 10,877,698 | B2 | 12/2020 | Jung et al. |
| 11,513,701 | B2 | 11/2022 | Shveidel et al. |

(Continued)

FOREIGN PATENT DOCUMENTS

| JP | 5050508 B2 | 10/2012 |
| JP | 2014-106567 A | 6/2014 |

(Continued)

OTHER PUBLICATIONS

International Search Report dated Dec. 26, 2022, issued in International Application No. PCT/KR2022/014048.

*Primary Examiner* — Khoa D Doan
(74) *Attorney, Agent, or Firm* — Jefferson IP Law, LLP

(57) ABSTRACT

A method and a device are provided. The device includes a first memory, a second memory having a storage characteristic different from that of the first memory, and a processor operatively connected to at least one of the first memory and the second memory. The processor is configured to generate a logical storage area in a data area of the first memory, store designated data in the generated logical storage area, and enter a recovery mode to store the data stored in the logical storage area in the second memory, format the first memory, and move the data stored in the second memory to the data area of the first memory.

18 Claims, 11 Drawing Sheets

(56) References Cited

U.S. PATENT DOCUMENTS

| | | | |
|---|---|---|---|
| 2006/0015698 A1* | 1/2006 | Kim | G06F 11/1441 |
| | | | 714/E11.138 |
| 2010/0049750 A1 | 2/2010 | Srivastava et al. | |
| 2014/0140135 A1 | 5/2014 | Okano et al. | |
| 2014/0279930 A1 | 9/2014 | Gupta et al. | |
| 2014/0344234 A1* | 11/2014 | Amarendran | G06F 16/21 |
| | | | 707/694 |
| 2016/0306583 A1 | 10/2016 | Yun et al. | |
| 2017/0139634 A1 | 5/2017 | Lee et al. | |
| 2019/0036704 A1* | 1/2019 | DeVetter | H04L 9/14 |
| 2020/0142638 A1* | 5/2020 | Byun | G11C 16/10 |
| 2021/0271572 A1* | 9/2021 | Qi | G06F 9/445 |
| 2021/0325948 A1 | 10/2021 | Lee et al. | |
| 2022/0334732 A1* | 10/2022 | Huang | G06F 11/1451 |

FOREIGN PATENT DOCUMENTS

| | | |
|---|---|---|
| JP | 6522812 B2 | 5/2019 |
| KR | 10-2001-0030270 A | 4/2001 |
| KR | 10-0667694 B1 | 1/2007 |
| KR | 10-2008-0028166 A | 3/2008 |
| KR | 10-2016-0012572 A | 2/2016 |
| KR | 10-1591550 B1 | 2/2016 |
| KR | 10-2016-0122413 A | 10/2016 |
| WO | 2020/027413 A1 | 2/2020 |

\* cited by examiner

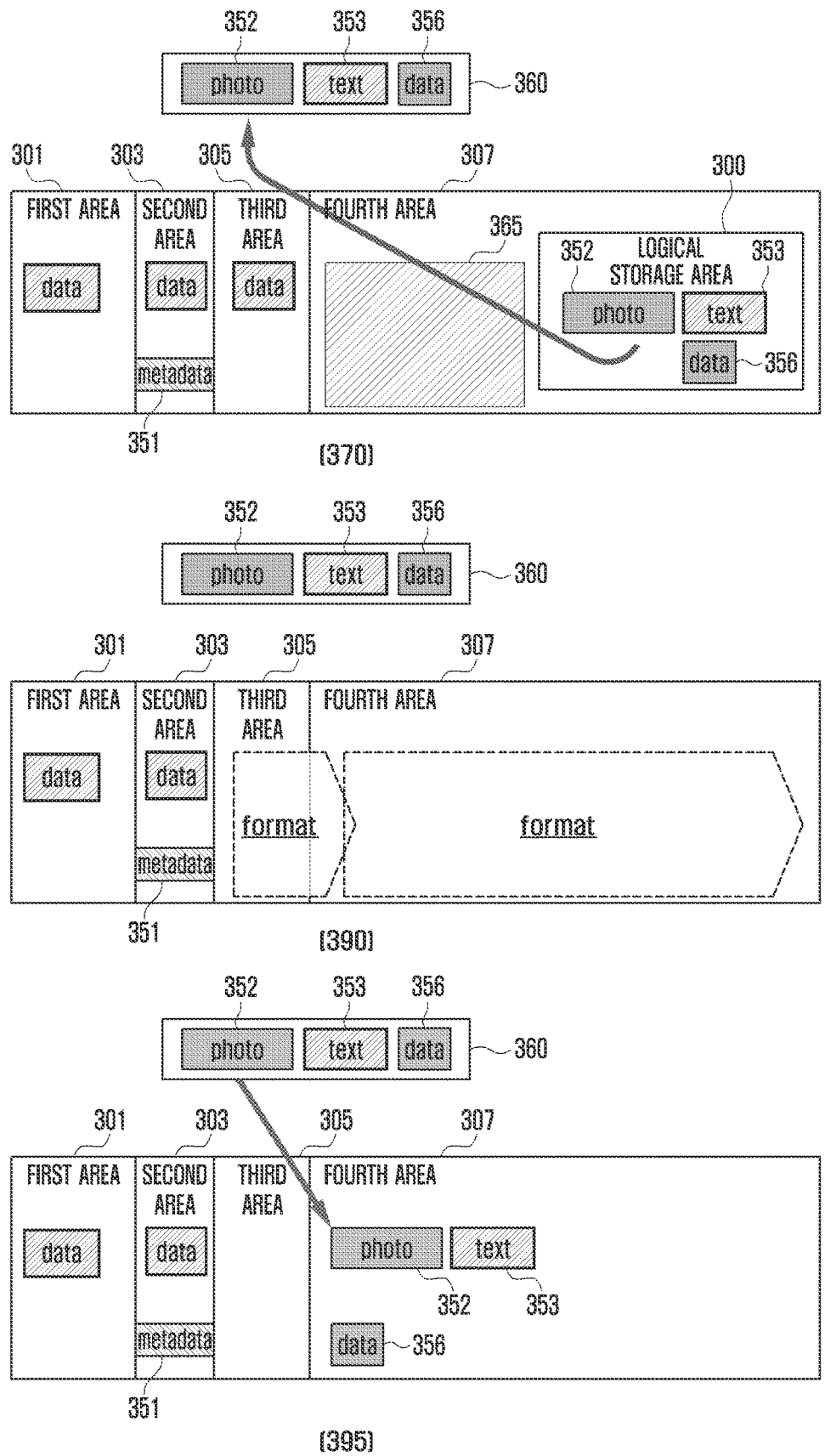

[710]

[730]

METHOD FOR PRESERVING DATA IN ELECTRONIC DEVICE INITIALIZATION SITUATION AND ELECTRONIC DEVICE THEREFOR

CROSS-REFERENCE TO RELATED APPLICATION(S)

This application is a continuation application, claiming priority under § 365(c), of an International application No. PCT/KR2022/014048, filed on Sep. 20, 2022, which is based on and claims the benefit of a Korean patent application number 10-2021-0153906, filed on Nov. 10, 2021, in the Korean Intellectual Property Office, and of a Korean patent application number 10-2021-0188159, filed on Dec. 27, 2021, in the Korean Intellectual Property Office, the disclosure of each of which is incorporated by reference herein in its entirety.

TECHNICAL FIELD

The disclosure relates to a method for preserving data in an electronic device initialization situation, and an electronic device therefor.

BACKGROUND ART

In line with development of digital technologies, there has been widespread use of various kinds of electronic devices such as a mobile communication terminal, a personal digital assistant (PDA), an electronic diary, a smartphone, a tablet personal computer, and a wearable device. The hardware part and/or software part of such electronic devices have been continuously improved to support and enhance the functionality of electronic devices.

An electronic device may store messages, contact lists, photographs, moving images, documents, files, or other pieces of data in the course of being used by a user. The storage size (or capacity) of the electronic device may differ depending on the manufacturer or each electronic device model. If a situation requiring initialization of the electronic device occurs, the user may select desired pieces of data from pieces of data stored in the electronic device and may back up the same in an external storage space, thereby preventing deletion of desired data. For example, the external storage space may be a computer (or laptop), an external memory (for example, secure digital (SD) card), or a cloud server. If the electronic device is initialized without the backup process, data stored by the user is lost, and it may be impossible to recover the same.

The above information is presented as background information only to assist with an understanding of the disclosure. No determination has been made, and no assertion is made, as to whether any of the above might be applicable as prior art with regard to the disclosure.

DISCLOSURE OF INVENTION

Technical Problem

Some users may find it difficult to back up desired data in an external storage space. Furthermore, some users may be unaware of the fact that, if electronic devices are initialized without the backup process, all stored data will be lost. It may be very difficult for a user having a low level of understanding of electronic devices to back up desired data in an external storage space and then to initialize his/her electronic device. Another user (e.g., an acquaintance or a repair technician) may help the backup and initialization processes, but there is a possibility that data stored in the electronic device may be exposed by the other user during the processes.

Aspects of the disclosure are to address at least the above-mentioned problems and/or disadvantages and to provide at least the advantages described below. Accordingly, an aspect of the disclosure is to provide a method and a device wherein a logical storage area is generated in a designated area of a nonvolatile memory, data to be preserved is stored in the generated logical storage area, the data to be preserved, which is stored in the logical storage area, is stored in a volatile memory after entering a recovery mode, the designated area of the nonvolatile memory is formatted, and the data to be preserved, which is stored in the volatile memory, is stored in the designated area of the nonvolatile memory.

Additional aspects will be set forth in part in the description which follows and, in part, will be apparent from the description, or may be learned by practice of the presented embodiments.

Solution to Problem

In accordance with an aspect of the disclosure, an electronic device is provided. The electronic device includes a first memory, a second memory having a storage characteristic different from that of the first memory, and a processor operatively connected to at least one of the first memory and the second memory, wherein the processor is configured to generate a logical storage area in a data area of the first memory, store designated data in the generated logical storage area, enter a recovery mode to store the data stored in the logical storage area in the second memory, format the first memory, and move the data stored in the second memory to the data area of the first memory.

In accordance with another aspect of the disclosure, a method for operating an electronic device including a first memory and a second memory having a storage characteristic different from that of the first memory is provided. The method includes generating a logical storage area in a data area of the first memory, storing designated data in the generated logical storage area, entering a recovery mode to store the data stored in the logical storage area in the second memory, formatting the first memory, and moving the data stored in the second memory to the data area of the first memory.

Advantageous Effects of Invention

According to various embodiments, an electronic device may be initialized while preserving desired pieces of data, among pieces of data stored in the electronic device, without using an external storage space.

According to various embodiments, it is unnecessary to back up desired data in an external storage space and to store the same back in the electronic device after initialization of the electronic device is completed, thereby shortening the time taken for initialization and desired data preservation, simplifying the process, and minimizing user inconvenience.

According to various embodiments, it is unnecessary to back up desired data in an external storage space to preserve the same, thereby reducing the risk of exposure of the data to the outside.

According to various embodiments, even if an electronic device is initialized inadvertently, desired data is preserved, even without the user's choice, and the electronic device is then initialized, thereby preventing deletion of important data.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF DRAWINGS

The above and other aspects, features, and advantages of certain embodiments of the disclosure will be more apparent from the following description taken in conjunction with the accompanying drawings, in which:

FIGS. 3A and 3B illustrate examples of formatting while preserving data in an electronic device according to various embodiments of the disclosure;

Throughout the drawings, it should be noted that like reference numbers are used to depict the same or similar elements, features, and structures.

MODE FOR THE INVENTION

The following description with reference to the accompanying drawings is provided to assist in a comprehensive understanding of various embodiments of the disclosure as defined by the claims and their equivalents. It includes various specific details to assist in that understanding, but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but are merely used by the inventor to enable a clear and consistent understanding of the disclosure. Accordingly, it should be apparent to those skilled in the art that the following description of various embodiments of the disclosure is provided for illustration purposes only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
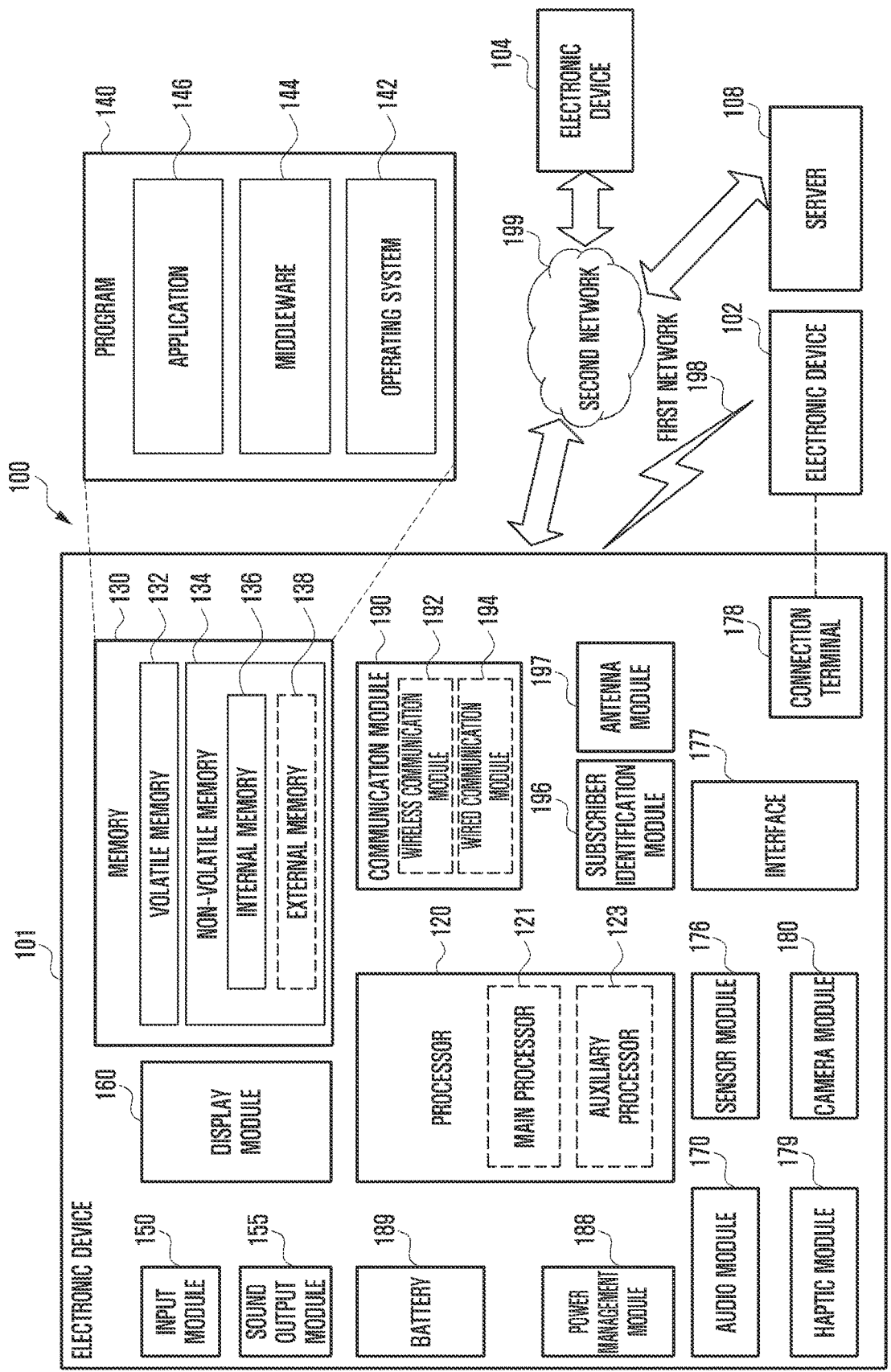
FIG. 1 is a block diagram of an electronic device in a network environment according to an embodiment of the disclosure.

FIG. 1 is a block diagram illustrating an electronic device 101 in a network environment 100 according to an embodiment of the disclosure.

Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted Boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, an SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5th generation (5G) network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4th generation (4G) network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to certain embodiments, the antenna module 197 may form a mmWave antenna module. According to an embodiment, the mmWave antenna module may include a printed circuit board, an RFIC disposed on a first surface (e.g., the bottom surface) of the PCB, or adjacent to the first surface and capable of supporting a designated high-frequency band (e.g., the mmWave band), and a plurality of antennas (e.g., array antennas) disposed on a second surface (e.g., the top or a side surface) of the PCB, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an Internet-of-things (IOT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

The electronic device according to certain embodiments may be one of various types of electronic devices. The electronic devices may include, for example, a portable communication device (e.g., a smart phone), a computer device, a portable multimedia device, a portable medical device, a camera, a wearable device, or a home appliance. According to an embodiment of the disclosure, the electronic devices are not limited to those described above.

It should be appreciated that certain embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Certain embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to certain embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to certain embodiments, each component (e.g., a module or a program) of the above-described components may include a single entity or multiple entities, and some of the multiple entities may be separately disposed in different components. According to certain embodiments, one or more of the above-described components may be omitted, or one or more other components may be added. Alternatively or additionally, a plurality of components (e.g., modules or programs) may be integrated into a single component. In such a case, according to certain embodiments, the integrated component may still perform one or more functions of each of the plurality of components in the same or similar manner as they are performed by a corresponding one of the plurality of components before the integration. According to certain embodiments, operations performed by the module, the program, or another component may be carried out sequentially, in parallel, repeatedly, or heuristically, or one or more of the operations may be executed in a different order or omitted, or one or more other operations may be added.

An electronic device (e.g., the electronic device 101 of FIG. 1) according to various embodiments of the disclosure may include a first memory (e.g., the non-volatile memory 134 of FIG. 1), a second memory (e.g., the volatile memory 132 of FIG. 1) having a storage characteristic different from that of the first memory, or/and a processor (e.g., the processor 120 of FIG. 1) operatively connected to at least one of the first memory and the second memory, and the processor may be configured to generate a logical storage area in a data area of the first memory, store designated data in the generated logical storage area, enter a recovery mode to store the data stored in the logical storage area in the second memory, format the first memory, and move the data stored in the second memory to the data area of the first memory.

The first memory may be a non-volatile memory, and the second memory may be a volatile memory.

The processor may be configured to generate the logical storage area when execution of the recovery mode is requested.

The processor may be configured to perform at least one of determining the designated data, based on a usage history of the electronic device, receiving a selection of the designated data from a user whenever data is stored, or receiving a selection of the designated data from the user when the recovery mode is executed.

The processor may be configured to store metadata corresponding to the logical storage area in a designated area of the first memory, and mount the logical storage area, based on the metadata, in case that entry into the recovery mode is made.

The processor may be configured to encrypt the metadata to store the encrypted metadata in the designated area, or store the metadata in an encrypted space of the designated area without encrypting the metadata.

The processor may be configured to delete the metadata after moving the data stored in the second memory to the data area of the first memory.

The designated area may be configured to have a read/write (R/W) format storage characteristic when the electronic device is in a normal operation mode, and the data area may be configured to have an R/W format storage characteristic when the electronic device is in a normal operation mode while having a storage characteristic in which the data area is not mounted as a file system when the electronic device is in the recovery mode.

The processor may be configured to mount the first memory after formatting the first memory, and copy the data stored in the second memory such that the copied data is moved and stored in the data area of the first memory.

The processor may be configured to control a size of the designated data, based on whether the size of the designated data exceeds a storage size of the second memory.

The processor may be configured to identify the storage size of the second memory, determine whether the size of the designated data exceeds the storage size of the second memory, select partial data, based on a usage history or a user input of the electronic device, when the size of the designated data exceeds the storage size of the second memory, and back up the selected partial data as the designated data in the logical storage area.

Figure 2:
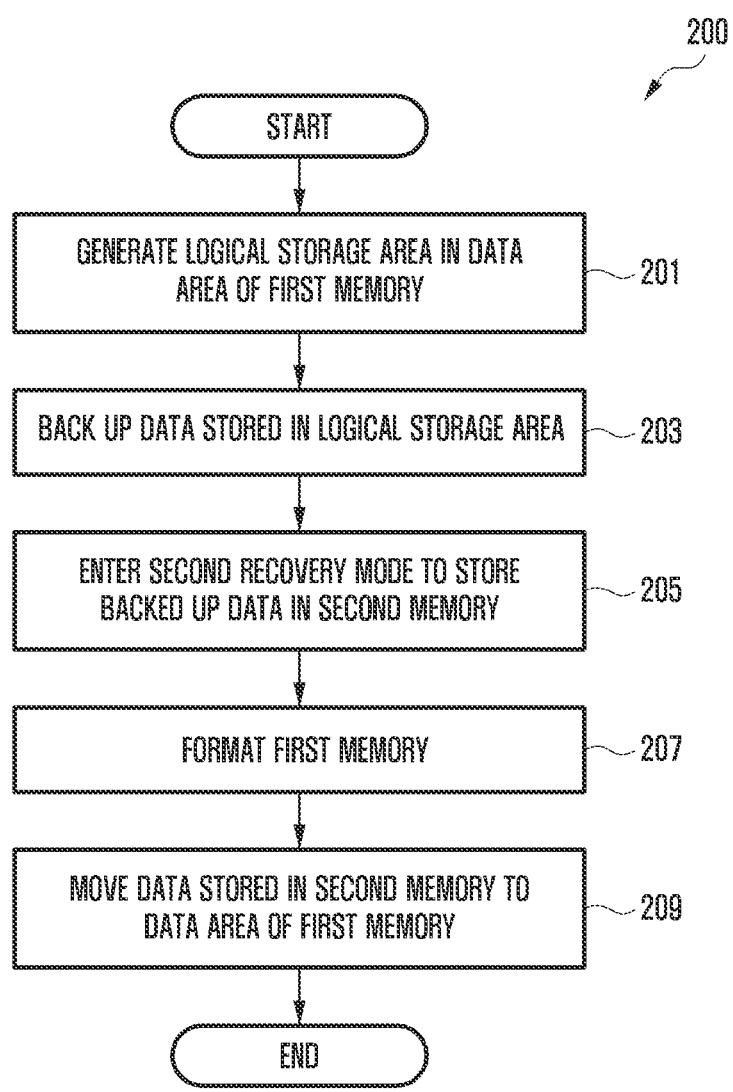
FIG. 2 is a flowchart showing a method for operating an electronic device according to an embodiment of the disclosure.

FIG. 2 is a flowchart 200 showing a method for operating an electronic device according to an embodiment of the disclosure.

Referring to FIG. 2, in operation 201, the processor (e.g., the processor 120 of FIG. 1) of the electronic device (e.g., the electronic device 101 of FIG. 1) may generate a logical storage area in a data area of a first memory. The logical storage area (or a 'logical partition' or a 'logical storage space') may have a container-like structure capable of containing data. The memory (e.g., the memory 130 of FIG. 1) of the electronic device 101 may include a volatile memory (e.g., the volatile memory 132 of FIG. 1) or a non-volatile memory (e.g., the non-volatile memory 134 of FIG. 1). The first memory may refer to the non-volatile memory 134. The electronic device 101 may use the entire space of the memory 130 as one or more divided individual storage spaces rather than using the same as one space. The data area may be referred to as a partition as one of the storage spaces of the first memory. Hereinafter, the partition will be collectively referred to as an 'area'. In case that a user intends to store data in the electronic device 101, the data may be stored in the data area.

Each area may have a read only (RO) format or a read/write (R/W) format storage characteristic. The RO format is an area (e.g., an inaccessible area) of the electronic device 101 which cannot be used by a user and may be restricted to be edited only by a systematic operation of the electronic device 101. The RO format may be a format which is editable only during software update and is not editable by a user. The R/W format may be a continuously editable and erasable format. The data area may have an R/W format storage characteristic.

The processor 120 may perform operation 201 when receiving a request to execute the second recovery mode among the recovery modes of the electronic device 101. For example, a user may execute the second recovery mode among the recovery modes of the electronic device 101 in a setting menu of the electronic device 101. The recovery modes may include the first recovery mode or the second recovery mode. The recovery mode described herein may refer to a "second recovery mode". The first recovery mode is to factory reset the electronic device 101, and thus may be to delete all data stored in the electronic device 101. The second recovery mode may be to preserve partial data while initializing the electronic device 101. The first recovery mode may be a state in which a data restoration function (or mode) is inactivated, and the second recovery mode may be a state in which a data restoration function is activated.

The recovery mode may include a first operation in which the data restoration function is inactivated or a second operation in which the data restoration function is activated.

In this case, the recovery mode described in the claims may refer to the second operation.

Alternatively, in case that a user input (e.g., simultaneously pressing a volume button and a power button) configured while the electronic device 101 is booted is detected, the processor 120 may determine that execution of the second recovery mode has been requested. In case that rebooting is performed without completion of a configuration operation during an initial-configuration operation (e.g., an operation of configuring the electronic device 101 for the first time after purchasing the electronic device 101 or an operation of testing the electronic device 101 before shipment) of the electronic device 101, and a user input (e.g., simultaneously pressing the volume button and the power button) configured during the rebooting is detected, the processor 120 may determine that execution of the second recovery mode has been requested.

Alternatively, in case that an external electronic device (e.g., a computer, a notebook computer) is connected to the electronic device 101 by wire and the second recovery mode is selected in the electronic device 101, the processor 120 may determine that execution of the second recovery mode has been requested. In case that the external electronic device is connected to the electronic device 101 by wire and a backup is requested from the external electronic device, the processor 120 may determine that the electronic device 101 possibly enters the recovery mode in the future to entirely initialize the electronic device 101, and accordingly, may perform necessary preparation tasks.

The processor 120 may perform operations 201 and 203 before executing the second recovery mode.

In operation 203, the processor 120 may back up designated data in the logical storage area. The designated data may be data configured (or determined) to be saved by the electronic device 101 or the user. The processor 120 may determine designated data, based on a usage history of the electronic device 101. The usage history may include at least one of how often (e.g., the hours of use, the number of uses) data (e.g., an application, a photo, a document, a file) has been used, whether data was used within a specified period (e.g., within 24 hours, within 7 days, within a month), how old data is, or the importance of data.

For example, the designated data may be designated in the earliest generated and stored data order, the most recently generated data order, the most frequently accessed data record order, or the order of data (e.g., a certificate) determined to be generally important. Whenever a user stores data, the processor 120 may receive a selection from the user whether the data is to be preserved even after the electronic device 101 is initialized. The processor 120 may receive a selection of data to be preserved from the user before performing the second recovery mode of the electronic device 101. The processor 120 may copy the designated data from among the data stored in the data area and move the copied data to the logical storage area to store the same.

The processor 120 may store metadata corresponding to the logical storage area in a designated area of the first memory. The processor 120 may extract the metadata and store the same in the designated area of the first memory. The designated area may be accessible in a normal operation mode and the second recovery mode, and may have an R/W format storage characteristic. The normal operation mode may refer to a state in which the electronic device 101 can be manipulated by a user. The second recovery mode is one of the recovery modes of the electronic device 101, and may be to preserve partial data while initializing the electronic device 101. The processor 120 may encrypt the metadata to store the same in the designated area, or may store the metadata in an encrypted space (e.g., a trust zone, a metadata storage space) of the designated area without encrypting the metadata.

In operation 205, the processor 120 may enter the second recovery mode and store the backed up data in the second memory. The second memory may be a volatile memory 132. The volatile memory 132 may have a characteristic in which data stored in the volatile memory 132 is deleted when the electronic device 101 is powered off or booted (or rebooted). Since all data stored in the second memory is deleted when the electronic device 101 is booted (or rebooted), the processor 120 may reboot the electronic device 101 to enter the second recovery mode. The processor 120 may store the backed up data in the second memory.

The data area of the first memory may not be accessible when an entry into the recovery mode (e.g., including both the first recovery mode and the second recovery mode) is made. In the recovery mode, the data area may not be mounted in terms of security and user data protection. Even if the data area is mounted, the data may not be accessible because all data stored in the data area are encrypted. In order to store the data backed up in the logical storage area in the second memory, the processor 120 may mount the logical storage area, based on metadata stored in the designated area. The mounting the logical storage area, based on the metadata, may be performed using a technology such as a device mapper (DM).

When the logical storage area is successfully mounted, data stored in the logical storage area may be accessible. The processor 120 may mount only the logical storage area of the data area without mounting the entire data area. The processor 120 may mount the logical storage area, based on metadata stored in the designated area, and store data backed up in the mounted logical storage area in the second memory. Since the data area and data stored in the logical storage area included in the data area are deleted when the electronic device 101 is formatted, the processor 120 may copy the data (e.g., designated data) backed up in the logical storage area, and move the copied data to store the same in the second memory before the electronic device 101 is formatted.

The metadata may be deleted when designated data is safely preserved. Since an error may occur in copying and storing data backed up in the logical storage area to the second memory, the metadata may be deleted only when the designated data is safely preserved (e.g., after operation 209). For example, in case that an error occurs in copying and storing data backed up in the logical storage area to the second memory, the mounting the logical storage area, based on the metadata, may be retried.

In operation 207, the processor 120 may format the first memory. The format is an operation of factory resetting the electronic device 101, and the processor 120 may delete data stored in the first memory. The first memory may be divided into a plurality of areas to be used. For example, the first memory may include at least one of a first area (or a storage area), a second area, a third area, and a fourth area. The first area may have an RO format storage characteristic when the electronic device 101 is in a normal operation mode, and the second area and the third area may have an R/W format storage characteristic when the electronic device 101 is in the normal operation mode. The fourth area may have an R/W format storage characteristic when the electronic device 101 is in the normal operation mode but may have a storage characteristic in which the fourth area is not mounted as a file system when the electronic device 101 is in the recovery mode.

For example, the first area may be a system area, the second area may be an encryption file system (efs), the third area may be a cache area, and the fourth area may be the data area. The above example is provided to help the understanding of the disclosure, and the disclosure is not limited by the example. When the first memory is formatted, the processor 120 may delete data stored in the third area and the fourth area. Although it is described that the first memory is divided into four areas to help the understanding of the disclosure, the first memory may be divided into more or fewer than four areas.

In operation 209, the processor 120 may move the data stored in the second memory to the data area of the first memory. When the formatting of the first memory is completed, the data area of the first memory may be in an initial state in which a security-related function such as a mount prohibition mode or an encryption mode is not turned on yet. When the formatting of the first memory is completed, the data area may be mounted as a file system such as F2FS because of the completely basic state in which no data exists even in the file system. The processor 120 may mount the data area of the first memory and copy data stored in the second memory to the mounted data area. The processor 120 may copy the data stored in the second memory, and move the copied data to store the same in the data area of the first memory. After the formatting of the first memory, the processor 120 may reboot the electronic device 101 after saving the data to be preserved in the first memory again. When the reboot of the electronic device 101 is completed, the processor 120 may operate the electronic device 101 in the normal operation mode.

Operations 201 to 203 may be operations performed in the normal operation mode of the electronic device 101, and operations 205 to 209 may be operations performed in the second recovery mode of the electronic device 101.

The processor 120 may store the designated data (e.g., data to be preserved) in the same storage space (or a storage path) as before, or may also store the same in a different storage space. The space in which the designated data is stored (or exists) before operation 201 and the space of the first memory in which the designated data is stored again after the format of the first memory may be the same or different. Since nothing is stored in the data area of the first memory when the first memory is formatted, an optimized storage path may be generated when the data area of the first memory is mounted. The processor 120 may store the designated data in the optimized storage path.

Figure 3A:
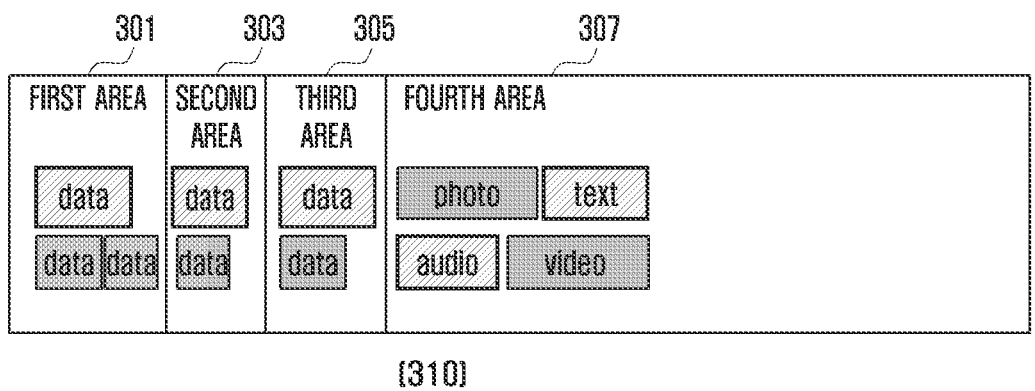
Figure 3A:
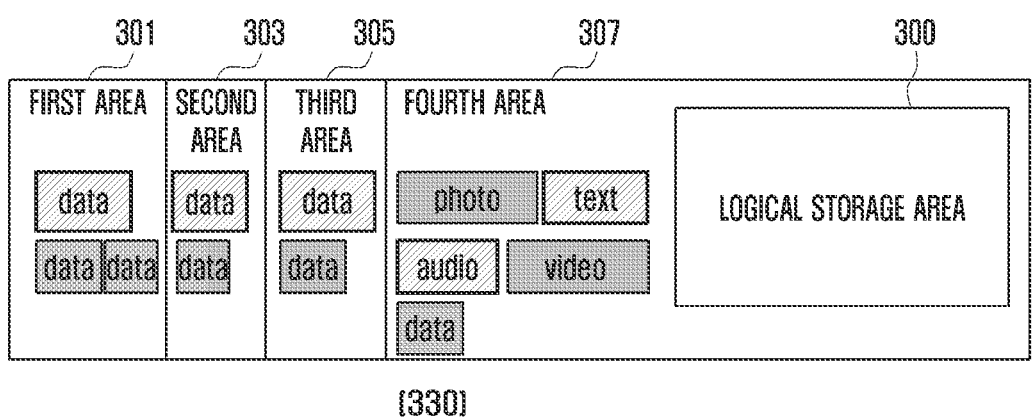
Figure 3A:
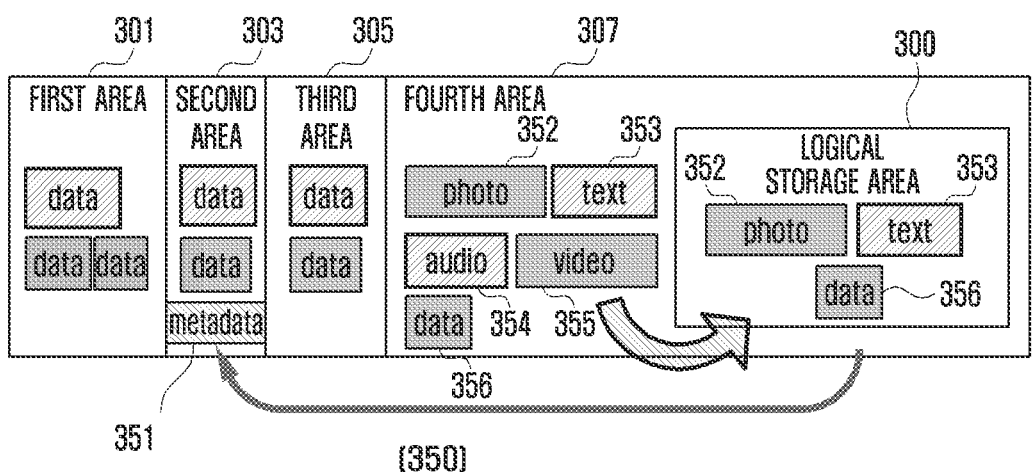

FIGS. 3A and 3B illustrate examples of formatting while preserving data in an electronic device according to various embodiments of the disclosure.

Referring to FIG. 3A, an electronic device (e.g., the electronic device 101 of FIG. 1) may be operated by a user while operating in a normal operation mode. While the electronic device 101 operates in the normal operation mode, processed data may be stored in a memory (e.g., the memory 130 of FIG. 1). The memory 130 may include a first memory or a second memory. The first memory may be a non-volatile memory (e.g., the non-volatile memory 134 of FIG. 1), and the second memory may be a volatile memory (e.g., the volatile memory 132 of FIG. 1). The electronic device 101 may use the entire storage space (or area) of the nonvolatile memory 134 as one or more divided individual storage spaces rather than using the same as one space. For example, the electronic device 101 may use the nonvolatile memory 134 partitioned (or divided) into four areas. Each area may have an RO format or an R/W format storage characteristic.

Referring to first reference numeral 310, the electronic device 101 may use the nonvolatile memory 134 divided into a first area 301, a second area 303, a third area 305, and a fourth area 307. Although FIG. 3A shows that the nonvolatile memory 134 is divided into four areas, the nonvolatile memory 134 may be divided into more or fewer than four areas according to the implementation of the electronic device 101. This is only an implementation issue, and the disclosure is not limited by the example.

The first area 301 has an RO format storage characteristic when the electronic device 101 is in the normal operation mode, and the second area 303 and the third area 305 may have an R/W format storage characteristic when the electronic device 101 is in the normal operation mode. The fourth area 307 may have an R/W format storage characteristic when the electronic device 101 is in the normal operation mode, but may have a storage characteristic in which the fourth area 307 is not mounted as a file system when the electronic device 101 is in the recovery mode. The recovery mode is one of the initialization modes of the electronic device 101 and may include a first recovery mode or a second recovery mode. The first recovery mode is to factory reset the electronic device 101, and thus may be to delete all data stored in the electronic device 101. The second recovery mode may be to preserve partial data while initializing the electronic device 101.

The first recovery mode may be a state in which a data restoration function (or mode) is inactivated, and the second recovery mode may be a state in which a data restoration function is activated. For example, the first area 301 may be a system area, the second area 303 may be EFS, the third area 305 may be a cache area, and the fourth area 307 may be the data area. The above examples are provided to help the understanding of the disclosure, and the disclosure is not limited by the examples.

Data stored in the first memory may not be initialized in a situation in which the electronic device 101 is being used normally (e.g., during the normal operation mode). The electronic device 101 may have the second recovery mode which is a state in which access to data stored in the first memory is partially restricted, and may be booted into the second recovery mode, and then the electronic device 101 may be initialized. Since the second recovery mode preserves partial data while initializing the electronic device 101, the electronic device 101 may perform an operation necessary for data preservation before entering the second recovery mode. When the second recovery mode is requested, the electronic device 101 may request password (or secret pattern) input or biometric authentication (e.g., fingerprint recognition, iris recognition, etc.) of the electronic device 101 for security.

Referring to second reference numeral 330, the electronic device 101 may generate a logical storage area 300 in the fourth area 307 when receiving a request to execute the second recovery mode. While the electronic device 101 operates in the normal operation mode, processed data may be stored in the first memory. Among the data, data stored by the user may be stored in the third area 305 or the fourth area 307. Initialization of the electronic device 101 may be to delete data stored in the third area 305 and the fourth area 307. The electronic device 101 may generate the logical storage area 300 in the fourth area 307 in the normal operation mode before entering the second recovery mode.

Referring to third reference numeral 350, the electronic device 101 may back up, in the logical storage area 300, designated data (e.g., photo 352, text 353, and data 356) among data (e.g., photo 352, text 353, audio 354, video 355, and data 356) stored in the fourth area 307. The photo 352 may be a photo (e.g., a photo stored in a gallery application, a photo or an icon stored in a contact application) stored in the first memory. The text 353 may be a note stored in a note application or contact information stored in a contact application. The data 356 may include at least one of an image, an audio, a video, or a text. For example, the data 356 may include application setting information or application update information. The designated data may be data configured (or determined) to be stored by the electronic device 101 or a user. The designated data may be system data of the electronic device 101 or may include user data stored by a user.

The electronic device 101 may determine designated data, based on a usage history of the electronic device 101. The usage history may include at least one of how often (e.g., the hours of use, the number of uses) data (e.g., an application, a photo, a document, a file) has been used, whether data was used within a specified period (e.g., within 24 hours, within 7 days, within a month), how old data is, or the importance of data. For example, the designated data may be designated in the earliest generated and stored data order, the most recently generated data order, the most frequently accessed data record order, or the order of data (e.g., a certificate) determined to be generally important.

Alternatively, whenever a user stores data, the electronic device 101 may receive a selection from the user whether the data is to be preserved even after the electronic device 101 is initialized. Before initialization of the electronic device 101 is performed, the electronic device 101 may receive, from the user, a selection of data to be saved. The electronic device 101 may copy the designated data (e.g., photo 352, text 353, data 356) among data (e.g., photo 352, text 353, audio 354, video 355, and data 356) stored in the fourth area 307 and move the copied data to store the same in the logical storage area 300.

Referring to fourth reference numeral 370 in FIG. 3B, the electronic device 101 may enter the second recovery mode and store backed up data in the second memory 360. The second memory 360 may be a volatile memory 132. The electronic device 101 may not be able to access data stored in the first memory when entering the second recovery mode. In the second recovery mode, the fourth area 307 of the first memory may not be mounted in terms of security and user data protection. The electronic device 101 may store metadata 351 corresponding to the logical storage area 300 generated in the fourth area 307 in a designated area of the first memory before entering the second recovery mode. The designated area may be accessible in the normal operation mode and may have a R/W format storage characteristic. For example, the designated area may be the second area 303. The electronic device 101 may encrypt the metadata 351 to store the metadata 351 in the second area 303, or may store the metadata 351 in an encrypted space (e.g., a trust zone, a meta data storage space) of the second area 303 without encrypting the metadata 351.

The metadata 351 may be an aggregate in which information for mounting the logical storage area 300 is configured. Each area (or partition) of the first memory may be formatted in a unique file system format and used. The metadata 351 may include the format of a file system or include information such as from which block to which block of the first memory the logical storage area 300 occupies, and where a root folder starts. To help understanding of the disclosure, FIG. 3B shows that metadata 351 is stored in the second area 303. The metadata 351 may be stored in an area that is not deleted when the first memory is formatted while having a R/W format storage characteristic in the normal operation mode and the second recovery mode of the electronic device 101.

The electronic device 101 may enter the second recovery mode and mount the logical storage area 300, based on the metadata 351 stored in the second area 303. When the logical storage area 300 is successfully mounted, the electronic device 101 may be able to access data (e.g., photo 352, text 353, and data 356) stored in the logical storage area 300. The electronic device 101 may store data stored (or backed up) in the logical storage area 300 in the second memory 360.

Referring to fifth reference numeral 390, the electronic device 101 may format the first memory. The format of the first memory may be to delete data stored in the third area 305 and the fourth area 307 included in the first memory. Although FIG. 3B shows that only data stored in the third area 305 and the fourth area 307 is deleted when the first memory is formatted, data stored in the first area 301 or the second area 303 may also be deleted or updated. This is only an issue on the implementation of the electronic device 101, and the disclosure is not limited by the description.

However, deleting all data stored in the first area 301 and the second area 303 may not be efficient in terms of usability of the electronic device 101. Since the first area 301 and the second area 303 are where the operating system or file system of the electronic device 101 is stored, when the first memory is formatted, data stored in the third area 305 and the fourth area 307 may be deleted whereas data stored in the first area 301 or the second area 303 may not be deleted. When the first memory is formatted, designated data (e.g., photo 352, text 353, and data 356) may be stored in the second memory 360.

Referring to sixth reference numeral 395, when the format of the first memory is completed, the electronic device 101 may store data stored in the second memory 360 (e.g., photo 352, text 353, data 356) in the fourth area 307. Due to the format of the first memory, all data stored in the third area 305 and the fourth area 307 may be deleted. Since all data other than the designated data has been deleted due to the format of the first memory, when the formatting of the first memory is completed, the electronic device 101 may store the data to be preserved in the fourth area 307 again. Since the third area 305 and the fourth area 307 are in a completely basic state when the format of the first memory is completed, the electronic device 101 may mount the third area 305 or the fourth area 307 as a file system. The electronic device 101 may mount the fourth area 307 of the first memory, and may store the data (e.g., photo 352, text 353, data 356) stored in the second memory 360 in the mounted fourth area 307.

The electronic device 101 may be rebooted after the electronic device 101 stores designated data (e.g., photo 352, text 353, and data 356) in the fourth area 307. When the booting is completed, the electronic device 101 may operate in the normal operation mode.

Figure 4:
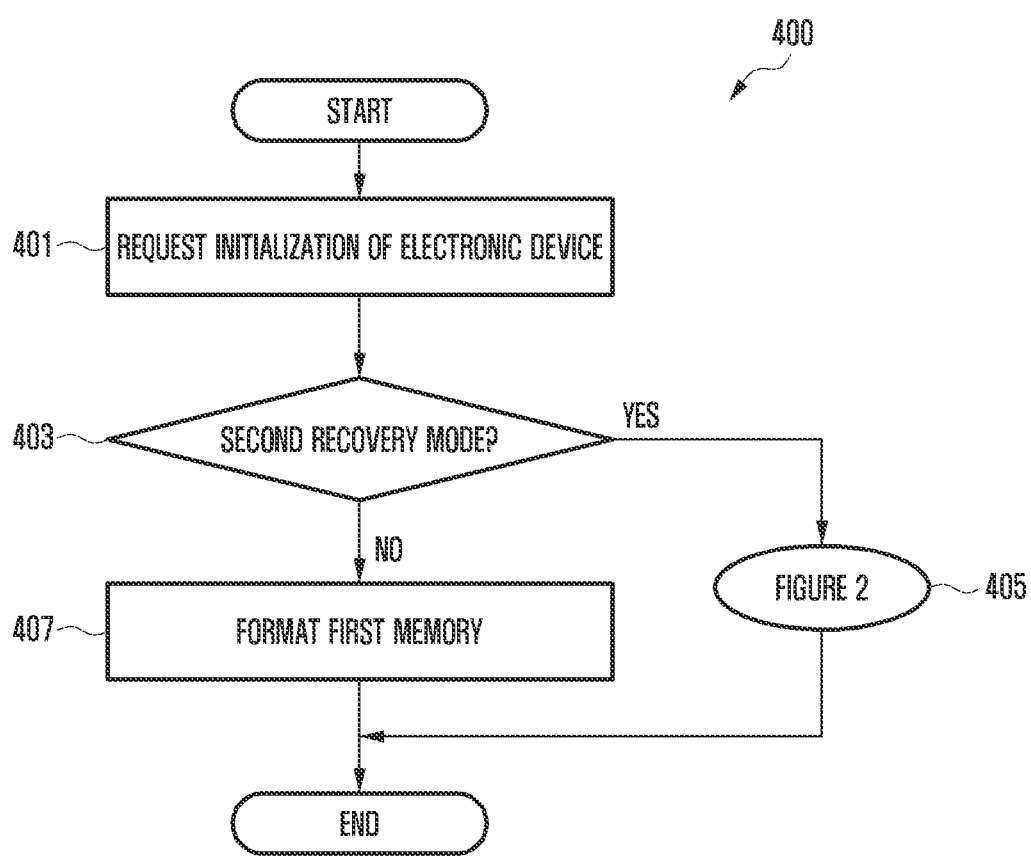
FIG. 4 is a flowchart showing a method for executing a recovery mode of an electronic device according to an embodiment of the disclosure.

FIG. 4 is a flowchart 400 showing a method for executing a recovery mode of an electronic device according to an embodiment of the disclosure.

Referring to FIG. 4, the processor (e.g., the processor 120 of FIG. 1) of the electronic device (e.g., the electronic device 101 of FIG. 1) may receive a request for initialization (e.g., an initialization mode, an initialization function, an initialization process) of the electronic device 101 in operation 401. For example, the processor 120 may receive a request from the user to initialize the electronic device 101. The initialization may include a first recovery mode (or function, process) or a second recovery mode. The first recovery mode is to factory reset the electronic device 101, and thus may be to delete all data stored in the electronic device 101. The second recovery mode may be to preserve partial data while initializing the electronic device 101. The first recovery mode may be a state in which a data restoration function (or mode) is inactivated, and the second recovery mode may be a state in which a data restoration function is activated. The recovery mode described in the claims may refer to a "second recovery mode".

In operation 403, the processor 120 may determine whether the initialization request is the second recovery mode. In case that the second recovery mode is selected by a user through the setting menu, the processor 120 may determine that the initialization request is the second recovery mode. In case that a user input (e.g., simultaneously pressing a volume button and a power button) configured while the electronic device 101 is booted is detected, the processor 120 may determine that execution of the second recovery mode has been requested. When an external electronic device (e.g., a computer or a notebook computer) is connected to the electronic device 101 by wire and the second recovery mode is selected in the electronic device 101, the processor 120 may determine that execution of the second recovery mode has been requested. When the external electronic device is connected to the electronic device 101 by wire and a backup is requested from the external electronic device, the processor 120 may determine that the electronic device 101 possibly enters the recovery mode in the future to entirely initialize the electronic device 101, and accordingly, may perform necessary preparation tasks.

The processor 120 may perform operation 405 in case that the initialization request is the second recovery mode, and perform operation 407 in case that the initialization request is not the first recovery mode.

In case that the initialization request is the second recovery mode, the processor 120 may perform an operation corresponding to FIG. 2 in operation 405. For example, the processor 120 may generate a logical storage area in a data area (e.g., the fourth area 307 of FIGS. 3A and 3B) of the first memory (e.g., the nonvolatile memory 134 of FIG. 1) before executing the second recovery mode, backs up a designated data in the logical storage area, enter the second recovery mode to store the backed up data in the second memory (e.g., the volatile memory 132 of FIG. 1), format the first memory, and move the data stored in the second memory to a data area of the first memory. After the data stored in the second memory is moved to the data area of the first memory, the processor 120 may reboot the electronic device 101 such that the electronic device 101 operates in the normal operation mode.

In case that the initialization request is the first recovery mode (e.g., in case that the initialization request is not the second recovery mode), the processor 120 may format the first memory in operation 407. For example, the processor 120 may delete data stored in a third area (e.g., the third area 305 of FIGS. 3A and 3B) and a fourth area (e.g., the fourth area 307 of FIGS. 3A and 3B) included in the first memory.

Figure 5:
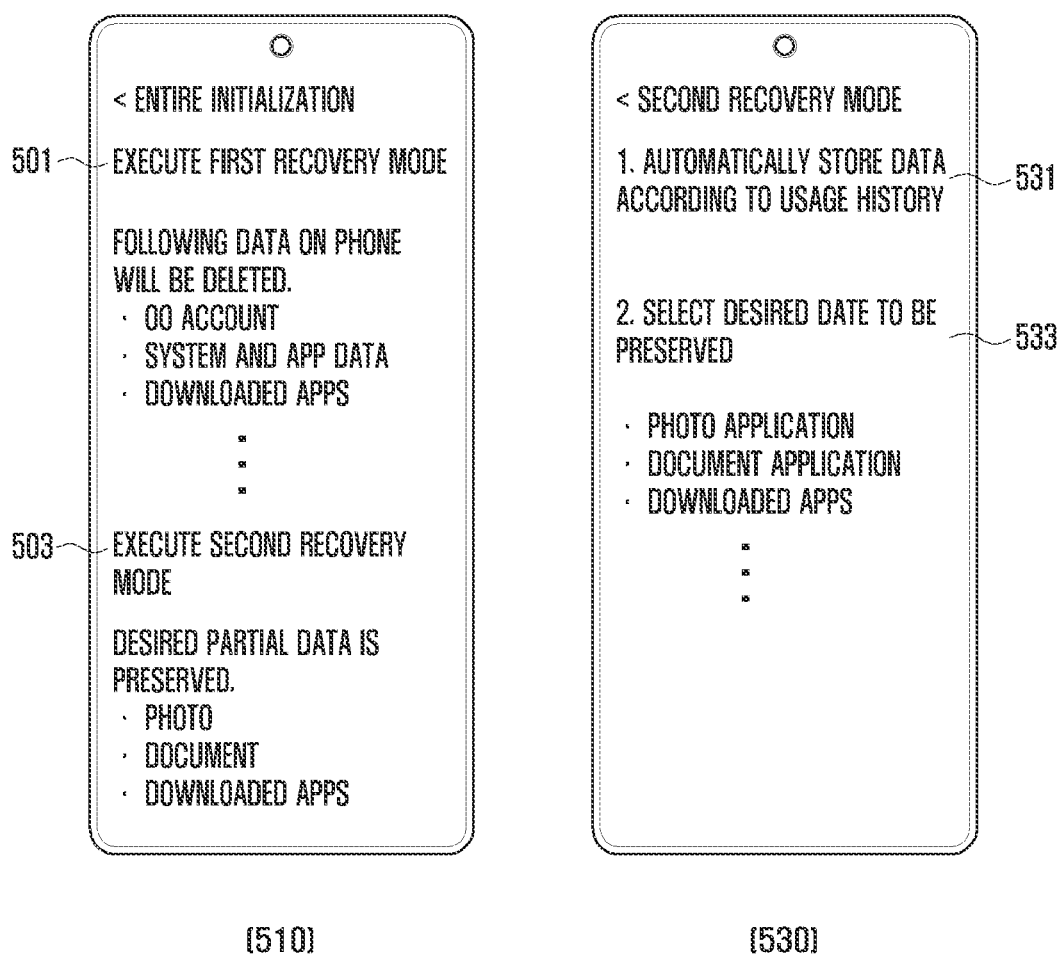
FIG. 5 illustrates a user interface for selecting data to be preserved in an electronic device according to an embodiment of the disclosure.

FIG. 5 illustrates a user interface for selecting data to be preserved in an electronic device according to an embodiment of the disclosure.

Referring to FIG. 5, an electronic device (e.g., the electronic device 101 of FIG. 1) may provide a first user interface 510 related to initialization of the electronic device 101 through a setting menu of the electronic device 101. The first user interface 510 may include a first recovery mode execution 501 related to execution of the first recovery mode or a second recovery mode execution 503 (or a second recovery mode execution button, a second recovery mode execution menu). The first user interface 510 may include a description related to the first recovery mode execution 501 or a description related to the second recovery mode execution 503. The description may include at least one of text, image, or video. When the first recovery mode execution 501 is selected, the electronic device 101 may factory reset the electronic device 101 by deleting all data stored in the electronic device 101.

When the second recovery mode execution 503 is selected, the electronic device 101 may provide a second user interface 530. When the second recovery mode is requested, the electronic device 101 may request password (or secret pattern) input or biometric authentication (e.g., fingerprint recognition, iris recognition, etc.) of the electronic device 101 for security.

The second user interface 530 may be for selecting data to be saved. The second user interface 530 may include data storage 531 or data selection to be preserved 533 according to a usage history. The data storage 531 according to the usage history may be to determine data to be directly preserved by the electronic device 101 according to the usage history of the electronic device 101. The usage history may include at least one of how often (e.g., the hours of use, the number of uses) data (e.g., an application, a photo, a document, a file) has been used, whether data was used within a specified period (e.g., within 24 hours, within 7 days, within a month), how old data is, or the importance of data. For example, the electronic device 101 may determine the more frequently used data as data to be preserved, determine the more recently used data as data to be preserved, the older data as data to be preserved, and the more important data as data to be preserved. The electronic device 101 may assign scores (or weights) to each data in the above manner, add up the scores, and determine designated data in the order of the highest score. When the data storage 531 according to the usage history is selected, the electronic device 101 may determine data to be preserved according to the usage history to store the data in the logical storage area.

Whenever a user stores data, the electronic device 101 may receive a selection from the user whether the data is to be preserved even after the electronic device 101 is initialized. In case that data to be preserved is selected by the user every time data is stored, the electronic device 101 may store the selected data in the logical storage area as in the case where the data storage 531 according to the usage history is selected.

The data selection to be preserved 533 may be a selection of data to be directly preserved by a user. When the data selection to be preserved 533 is selected, the electronic device 101 may provide data stored in the first memory. The electronic device 101 may directly receive a selection of data to be preserved from a user, and store the selected data in the logical storage area.

After the electronic device 101 stores data to be preserved in the logical storage area, the electronic device 101 may be rebooted to enter the second recovery mode. The electronic device 101 may perform operations included in FIG. 2 to preserve designated data while initializing the electronic device 101.

Figure 6:
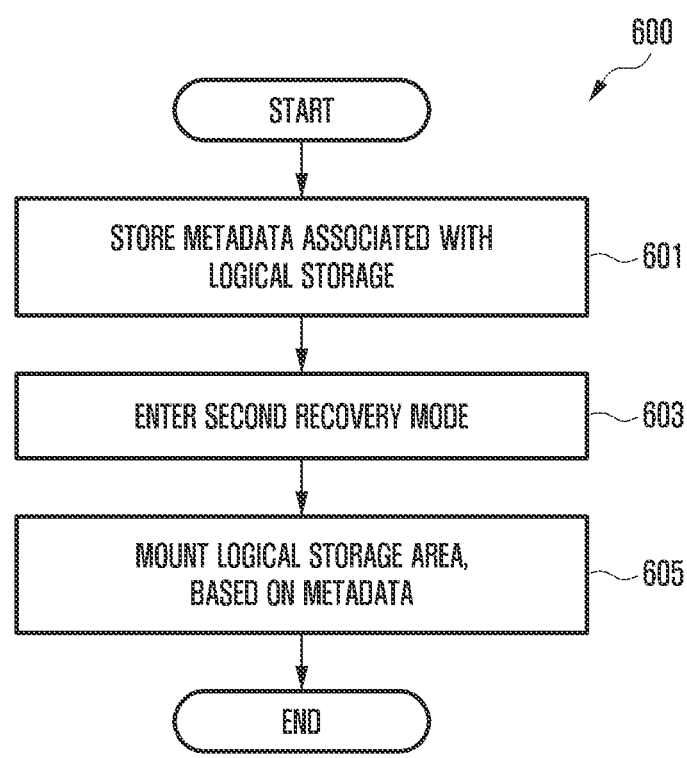
FIG. 6 is a flowchart showing a method for mounting a logical storage area of an electronic device according to an embodiment of the disclosure.

FIG. 6 is a flowchart 600 showing a method for mounting a logical storage area of an electronic device according to an embodiment of the disclosure.

Referring to FIG. 6, in operation 601, a processor (e.g., the processor 120 of FIG. 1) of an electronic device (e.g., the electronic device 101 of FIG. 1) may store metadata (e.g., the metadata 351 of FIGS. 3A and 3B) associated with a logical storage area (e.g., the logical storage area 300 of FIGS. 3A and 3B). The logical storage area 300 may be generated such that designated data is preserved without being deleted when the first memory (e.g., the nonvolatile memory 134 of FIG. 1) of the electronic device 101 is formatted. The processor may need to enter the second recovery mode to preserve the designated data without deleting the same when the first memory is formatted. The processor may not be able to access the logical storage area 300 of the first memory when entering the second recovery mode. In the second recovery mode, the data area (e.g., the fourth area 307 of FIGS. 3A and 3B) of the first memory may not be mounted in terms of security and user data protection. Since all data stored in the data area are encrypted, the data may not be accessible even if the data area is mounted.

The processor 120 may store metadata 351 for mounting the logical storage area 300 to access the logical storage area 300. The metadata 351 may include a format of a file system or include information such as from which block to which block of the first memory the logical storage area 300 occupies, and where a root folder starts. The processor 120 may store the metadata 351 in a designated area of the first memory. The processor 120 may encrypt and store the metadata 351 or store the metadata 351 in an encrypted storage space (e.g., a trust zone, a metadata storage space) without encrypting the metadata 351. Operation 601 may be performed after operation 203 of FIG. 2.

In operation 603, the processor 120 may enter the second recovery mode. The processor 120 may generate the logical storage area 300, and store the designated data in the logical storage area 300, and an operation of storing the metadata 351 may be performed in the case of a normal operation mode of the electronic device 101. In case that the storage of the metadata 351 is completed, the processor 120 may reboot the electronic device 101 to enter the second recovery mode. Since the logical storage area 300 is not mounted in the second recovery mode, data stored in the logical storage area 300 may not be accessible.

In operation 605, the processor 120 may mount the logical storage area 300, based on the metadata 351. The processor 120 may mount the logical storage area 300, based on the metadata 351, in order to access data stored in the logical storage area 300. The operation of mounting the logical storage area 300, based on the metadata 351, may be performed using a technology such as DM.

Figure 7:
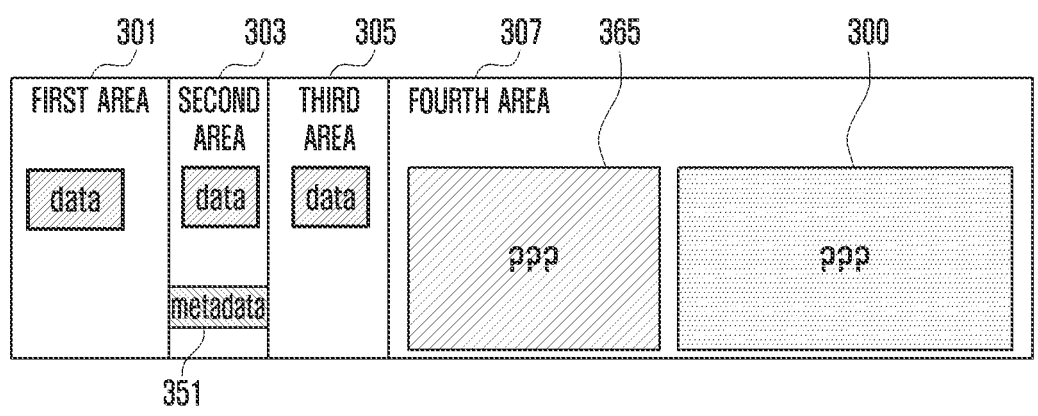
FIG. 7 illustrates an example of mounting a logical storage area by entering a second recovery mode in an electronic device according to an embodiment of the disclosure.
Figure 7:
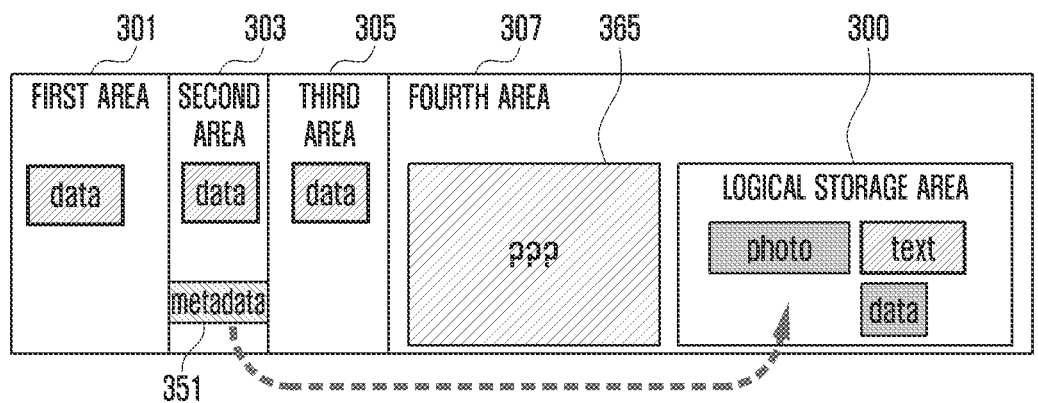

FIG. 7 illustrates an example of mounting a logical storage area by entering a second recovery mode in an electronic device according to an embodiment of the disclosure.

Referring to FIG. 7, when the electronic device (e.g., the electronic device 101 of FIG. 1) enters the second recovery mode, the electronic device may not be able to access the data area (e.g., the fourth area 307) of the first memory. The first memory may correspond to the nonvolatile memory 134 of FIG. 1. The first memory may be divided into a first area 301, a second area 303, a third area 305, and a fourth area 307 to be used. In the second recovery mode, the fourth area 307 of the first memory may not be mounted in terms of security and user data protection. The fourth area 307 may be a place where processed data is stored when the electronic device 101 operates in a normal operation mode. Since all data stored in the fourth area 307 are encrypted, the data may not be accessible even if the fourth area 307 is mounted.

Referring to first reference numeral 710, when the electronic device 101 operates in the normal operation mode, data to be stored may be stored in an original area 365, and data designated to be indelible through a data preservation function may be stored in the logical storage area 300. In the second recovery mode, both the original area 365 and the logical storage area 300 may be inaccessible. The electronic device 101 may store metadata 351 in the second area 303 to enter the second recovery mode and access the logical storage area 300. The metadata 351 may be an aggregate in which information for mounting the logical storage area 300 is configured.

Referring to second reference numeral 730, the electronic device 101 may mount the logical storage area 300, based on the metadata 351 stored in the second area 303. When the logical storage area 300 is successfully mounted, the electronic device 101 may be able to access data (e.g., a photo, a text, data) stored in the logical storage area 300.

Thereafter, the electronic device 101 may store data (e.g., a photo, a text, data) stored (or backed up) in the logical storage area 300 in the second memory. The second memory may correspond to the volatile memory 132 of FIG. 1.

Figure 8:
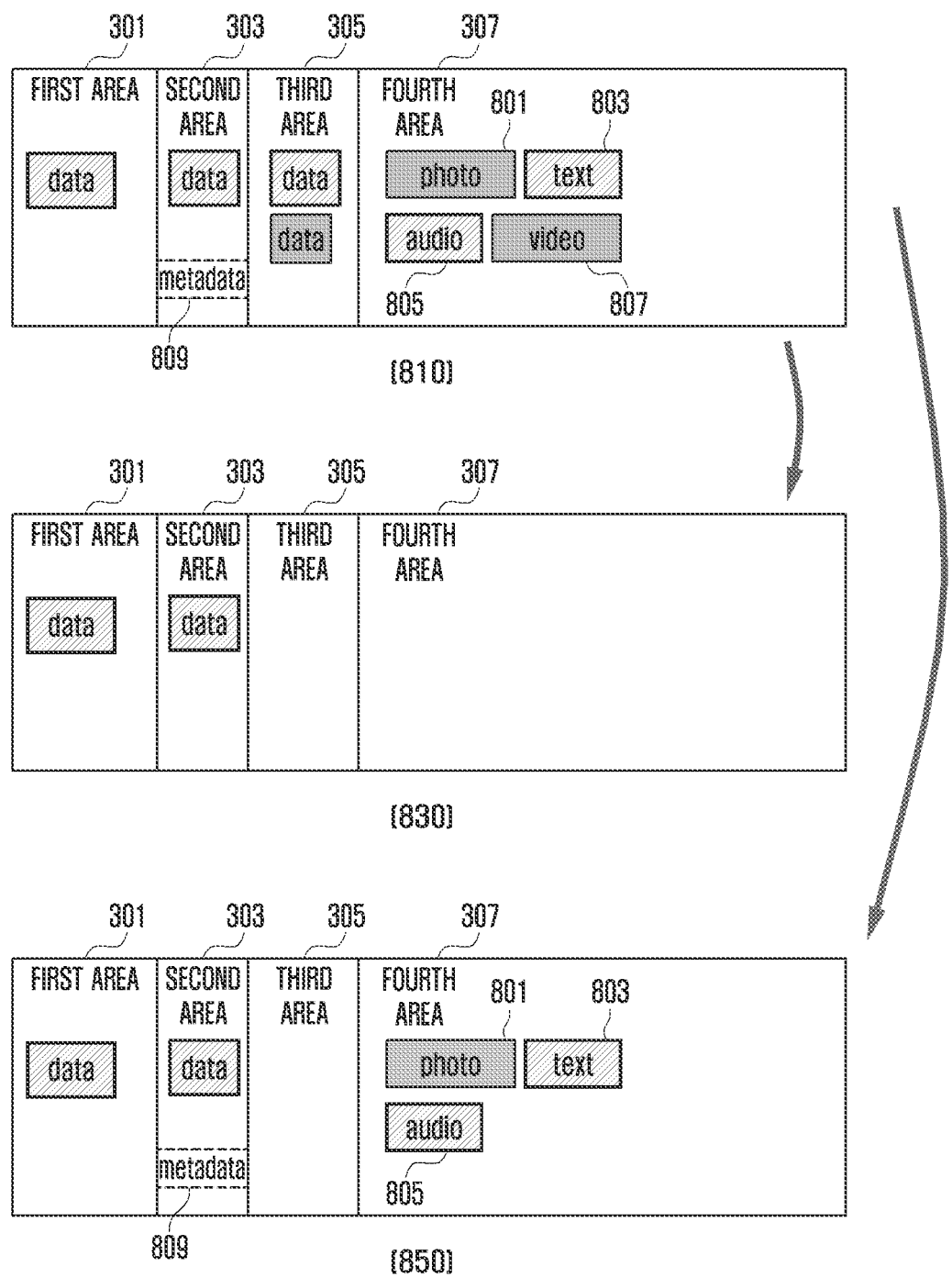
FIG. 8 illustrates an example of comparing a first recovery mode and a second recovery mode of an electronic device according to an embodiment of the disclosure.

FIG. 8 illustrates an example of comparing a first recovery mode and a second recovery mode of an electronic device according to an embodiment of the disclosure.

Referring to FIG. 8, an electronic device (e.g., the electronic device 101 of FIG. 1) may execute a first recovery mode or a second recovery mode. The electronic device 101 may process data according to a user's manipulation and store the data in the first memory 810 (e.g., the nonvolatile memory 134 of FIG. 1) when operating in the normal operation mode. The first memory 810 may be divided into a first area 301, a second area 303, a third area 305, and a fourth area 307 to be used. While the electronic device 101 operates in the normal operation mode, processed data may be stored in the third area 305 or the fourth area 307. Data requested to be stored by a user may be stored in the fourth area 307. The fourth area 307 may include at least one of a photo 801, a text 803, an audio 805, and a video 807.

The electronic device 101 may execute the first recovery mode or the second recovery mode according to a user's selection. When execution of the second recovery mode is requested, the electronic device 101 may store, in the second area 303, metadata 809 associated with a logical storage area (e.g., the logical storage area 300 of FIGS. 3A and 3B) in which designated data is stored. When execution of the first recovery mode is requested, the electronic device 101 may not store the metadata 809 in the second area 303.

When the first recovery mode 830 is executed, the electronic device 101 may delete data stored in the third area 305 and the fourth area 307. The electronic device 101 may format the third area 305 and the fourth area 307 to complete execution of the first recovery mode 830.

When the second recovery mode 850 is executed, the electronic device 101 may delete data stored in the third area 305 and the fourth area 307, except for designated data (e.g., a photo 801, a text 803, and an audio 805). For example, before execution of the second recovery mode 850 is requested, the electronic device 101 may determine data to be preserved or may receive a selection from a user. In the second recovery mode 850, the logical storage area 300 is mounted, based on the metadata 809, and thus the metadata 809 may be stored in the second area 303. When data preservation is successfully completed, the electronic device 101 may delete the metadata 809.

In comparison between the first recovery mode 830 and the second recovery mode 850, all data stored in the third area 305 and the fourth area 307 are deleted in the first recovery mode 830 while designated data (e.g., a photo 801, a text 803, and an audio 805) is preserved in the second recovery mode 850.

Figure 9:
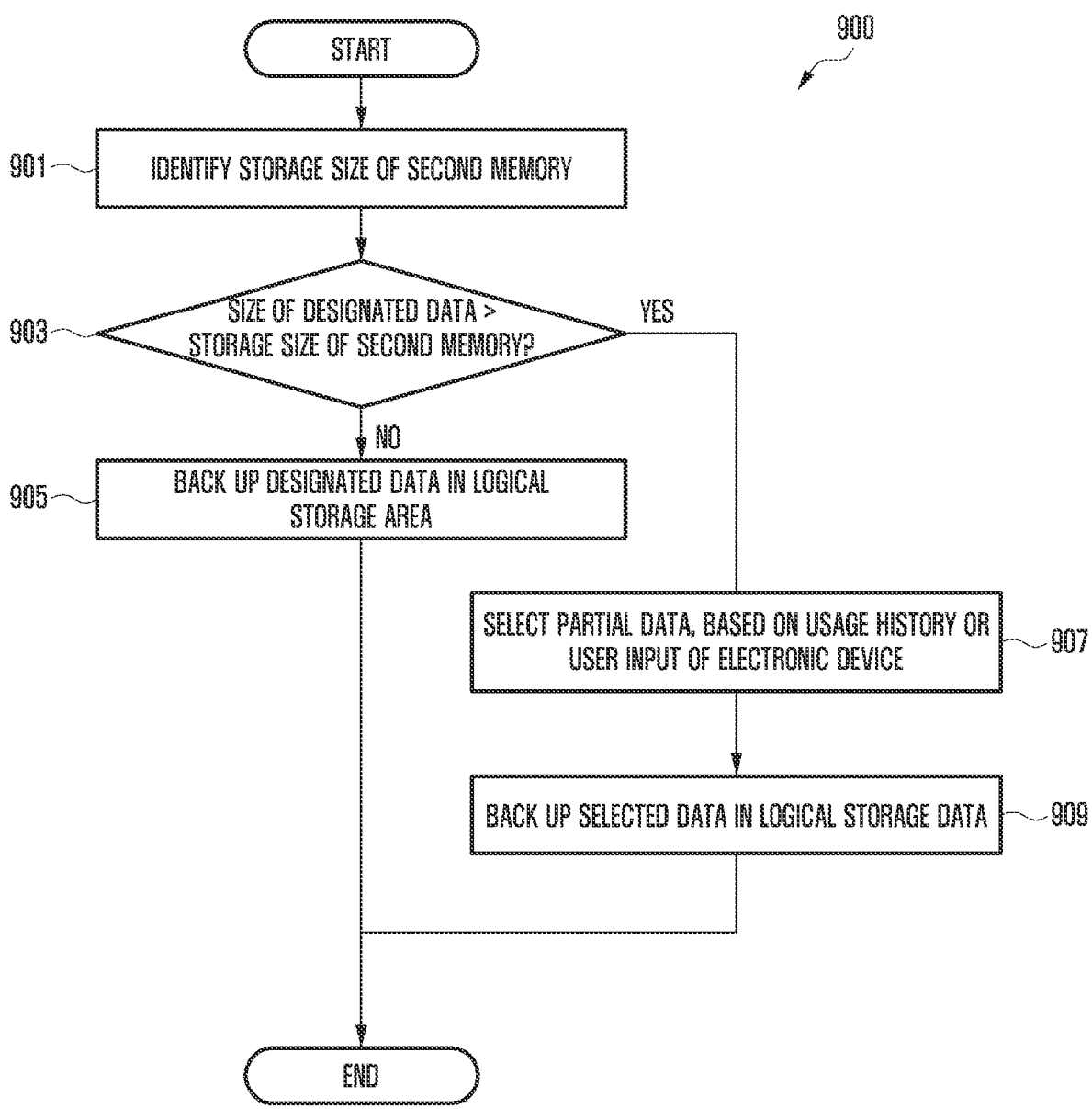
FIG. 9 is a flowchart showing a method for selecting data to be preserved, based on a size of a second memory in an electronic device according to an embodiment of the disclosure.

FIG. 9 is a flowchart 900 showing a method for selecting data to be preserved, based on a size of a second memory in an electronic device according to an embodiment of the disclosure.

Referring to FIG. 9, the processor (e.g., the processor 120 of FIG. 1) of an electronic device (e.g., the electronic device 101 of FIG. 1) may identify a storage size of the second memory in operation 901. The memory of the electronic device 101 (e.g., the memory 130 of FIG. 1) may include a volatile memory (e.g., the volatile memory 132 of FIG. 1) or a non-volatile memory (e.g., the non-volatile memory 134 of FIG. 1). The first memory may correspond to the non-volatile memory 134, and the second memory may correspond to the volatile memory 132. When the second recovery mode is executed, the processor 120 may store partial data (e.g., designated data) among the data stored in the first memory in the second memory to preserve the partial data. The processor 120 may control the size of the designated data, based on whether the size of the designated data exceeds the storage size of the second memory.

In case that the execution of the second recovery mode is requested, the processor 120 may perform operation 901. For example, the processor 120 may perform operation 901 before performing operation 201 of FIG. 2, or may perform operation 901 simultaneously with operation 201.

In operation 903, the processor 120 may determine whether the size of the designated data exceeds the storage size of the second memory. For example, in case that the size of the designated data is 8 Gbytes and the storage size of the second memory is 10 Gbytes, the processor 120 may determine that the size of the designated data is smaller than the storage size of the second memory. In case that the size of the designated data is 10 Gbytes and the storage size of the second memory is 10 Gbytes, the processor 120 may compress the designated data to reduce the size of the designated data. In case that the size of the designated data is 15 Gbytes and the storage size of the second memory is 10 Gbytes, the processor 120 may determine that the size of the designated data exceeds the storage size of the second memory.

In case that the size of the designated data exceeds the storage size of the second memory, the processor 120 may perform operation 907, and in case that the size of the designated data does not exceed the storage size of the second memory, the processor 120 may perform operation 905. In case that the size of the designated data is the same as the storage size of the second memory, the processor 120 may perform operation 905 or operation 907 according to the implementation of the electronic device 101.

In operation 905, in case that the size of the designated data does not exceed the storage size of the second memory, the processor 120 may back up the designated data in a logical storage area (e.g., the logical storage area 300 of FIGS. 3A and 3B). The designated data may be data configured (or determined) to be preserved by the electronic device 101 or a user. The processor 120 may determine designated data, based on a usage history of the electronic device 101. Whenever the user stores data, the processor 120 may receive a selection from the user whether the data is to be preserved even after the electronic device 101 is initialized. Before initialization of the electronic device 101 is performed, the processor 120 may receive a selection of data to be preserved from the user. The processor 120 may perform operation 201 of FIG. 2 to generate a logical storage area, and back up the designated data in the generated logical storage area. Operation 905 may be identical or similar to operation 203 of FIG. 2. The processor 120 may perform operations 205 to 209 of FIG. 2 after performing operation 905.

In operation 907, in case that the size of the designated data exceeds the storage size of the second memory, the processor 120 may select partial data, based on a usage history or a user input. In case that the size of the designated data exceeds the storage size of the second memory, all data to be preserved may not be stored in the second memory. Since all data to be preserved may not be preserved due to the small storage size of the second memory, the processor 120 may provide a user interface for requesting to select partial data from among the data to be preserved. The user may select partial data among the designated data through the user interface. Alternatively, the processor 120 may select partial data from among the designated data, based on the usage history of the electronic device 101. The processor 120 may select partial data important to the user from among the designated data, based on the use input.

In operation 909, the processor 120 may back up the selected data in a logical storage area (e.g., the logical storage area 300 of FIGS. 3A and 3B). The processor 120 may perform operation 201 of FIG. 2 to generate a logical storage area, and back up the designated data in the generated logical storage area. Operation 909 may be identical or similar to operation 203 of FIG. 2. In case that the storage size of the second memory is insufficient, the processor 120 may selectively store only partial data in the logical storage area. The processor 120 may perform operations 205 to 209 of FIG. 2 after performing operation 909.

Figure 10:
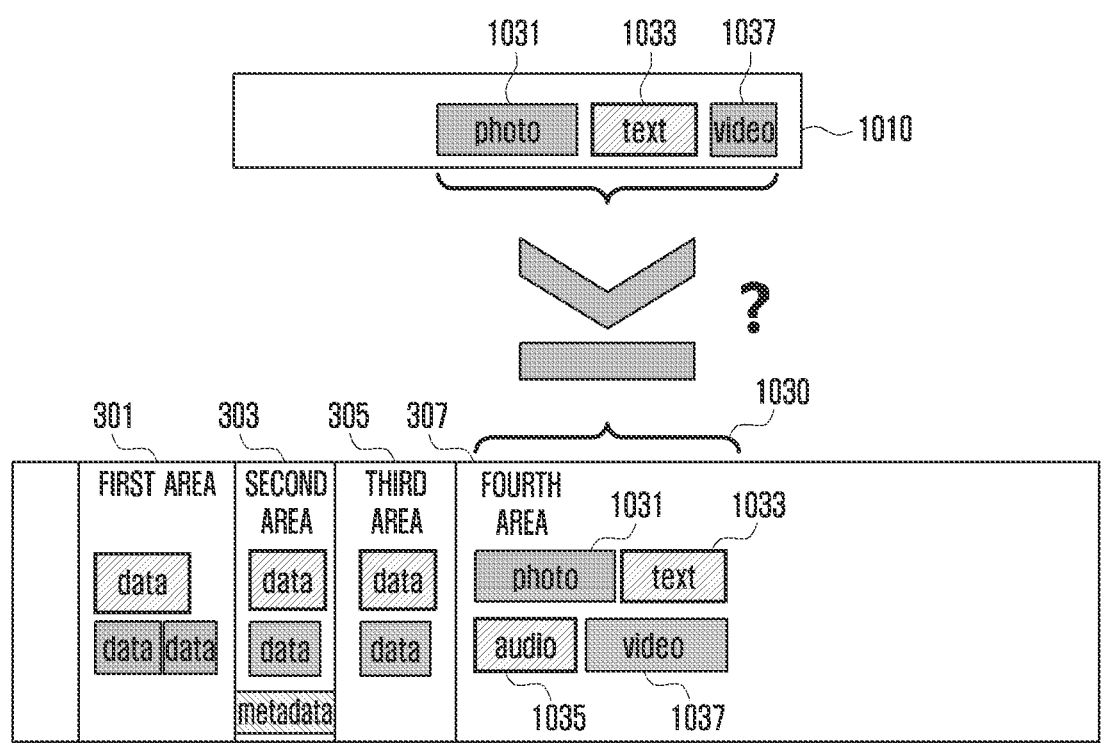
FIG. 10 illustrates an example of selecting data to be preserved, based on a size of a second memory in an electronic device according to an embodiment of the disclosure.

FIG. 10 illustrates an example of selecting data to be preserved, based on a size of a second memory in an electronic device according to an embodiment of the disclosure.

Referring to FIG. 10, a processor (e.g., the processor 120 of FIG. 1) of an electronic device (e.g., the electronic device 101 of FIG. 1) may determine whether the storage size of the second memory 1010 exceeds the size of the designated data 1030. The designated data 1030 may be stored in the fourth area 307 of the first memory. The first memory may be divided into the first area 301, the second area 303, the third area 305, and the fourth area 307 to store data. The designated data 1030 may include a photo 1031, a text 1033, an audio 1035, and a video 1037.

In case that the size of the designated data 1030 exceeds the storage size of the second memory 1010, the processor 120 may select partial data (e.g., a photo 1031, a text 1033, a video 1037) from among the designated data 1030 to back up the partial data in the logical storage area (e.g., the logical storage area 300 of FIGS. 3A and 3B). In the second recovery mode, data stored in the logical storage area 300 may be stored in the second memory 1010.

According to various embodiments of the disclosure, a method for operating an electronic device (e.g., the electronic device 101 of FIG. 1) including a first memory (e.g., the non-volatile memory 134 of FIG. 1) and a second memory (e.g., the volatile memory 132 of FIG. 1) having a storage characteristic different from that of the first memory may include generating a logical storage area in a data area of the first memory, storing designated data in the generated logical storage area, entering a recovery mode to store the data stored in the logical storage area in the second memory, formatting the first memory, and moving the data stored in the second memory to the data area of the first memory.

The first memory may be configured to be a non-volatile memory, and the second memory may be configured to be a volatile memory.

The generating may include generating the logical storage area when execution of the recovery mode is requested.

The method may further include performing at least one of determining the designated data, based on a usage history of the electronic device, receiving a selection of the designated data from a user whenever data is stored, or receiving a selection of the designated data from the user when the recovery mode is executed.

The method may further include storing the metadata corresponding to the logical storage area in a designated area of the first memory, and mounting the logical storage area, based on the metadata, when entry into the recovery mode is made.

The storing metadata may include encrypting the metadata to store the encrypted metadata in the designated area, or storing the metadata in an encrypted space of the designated area without encrypting the metadata.

The designated area may be configured to have a read/write (R/W) format storage characteristic when the electronic device is in a normal operation mode, and the data area may be configured to have an R/W format storage characteristic when the electronic device is in the normal operation mode while having a storage characteristic in which the data area is not mounted as a file system when the electronic device is in the recovery mode.

The moving may include mounting the first memory after formatting the first memory, and copying the data stored in the second memory such that the copied data is moved and stored in the data area of the first memory.

The storing of the designated data may include identifying a storage size of the second memory, determining whether a size of the designated data exceeds the storage size of the second memory, selecting partial data, based on a usage history or a user input of the electronic device, when the size of the designated data exceeds the storage size of the second memory, and backing up the selected partial data as the designated data in the logical storage area.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic device comprising:
   memory including first memory and second memory having storage characteristic different from that of the first memory; and
   at least one processor,
   wherein the memory stores instructions that, when executed by the at least one processor individually or collectively, cause the electronic device to:
   generate a logical storage area in a data area of the first memory,
   store designated data in the logical storage area,
   store metadata corresponding to the logical storage area in a designated area of the first memory,
   in response to entering a recovery mode, mount the logical storage area based on the metadata,
   store the data stored in the logical storage area in the second memory,
   format the first memory, and move the data stored in the second memory to the data area of the first memory.

2. The electronic device of claim 1,
wherein the first memory is non-volatile memory, and
wherein the second memory is volatile memory.

3. The electronic device of claim 1, wherein the instructions, when executed by the at least one processor, cause the electronic device to generate the logical storage area in case that execution of the recovery mode is requested.

4. The electronic device of claim 1, wherein the instructions, when executed by the at least one processor, cause the electronic device to perform at least one of:
determining the designated data, based on a usage history of the electronic device,
receiving a selection of the designated data from a user whenever data is stored, or
receiving a selection of the designated data from the user in case that the recovery mode is executed.

5. The electronic device of claim 1, wherein the instructions, when executed by the at least one processor, cause the electronic device to:
encrypt the metadata to store the encrypted metadata in the designated area, or
store the metadata in an encrypted space of the designated area without encrypting the metadata.

6. The electronic device of claim 1, wherein the instructions, when executed by the at least one processor, cause the electronic device to delete the metadata after moving the data stored in the second memory to the data area of the first memory.

7. The electronic device of claim 1,
wherein the designated area is configured to be accessible and have read/write (R/W) format storage characteristic in case that the electronic device is in a normal operation mode, and
wherein the data area is configured to have R/W format storage characteristic in case that the electronic device is in the normal operation mode while having storage characteristic in which the data area is not mounted as a file system in case that the electronic device is in the recovery mode.

8. The electronic device of claim 1, wherein the instructions, when executed by the at least one processor, cause the electronic device to:
mount the first memory after formatting the first memory, and
copy the data stored in the second memory such that the copied data is moved and stored in the data area of the first memory.

9. The electronic device of claim 1, wherein the instructions, when executed by the at least one processor, cause the electronic device to control a size of the designated data, based on whether the size of the designated data exceeds a storage size of the second memory.

10. The electronic device of claim 1, wherein the instructions, when executed by the at least one processor, cause the electronic device to:
identify a storage size of the second memory,
determine whether a size of the designated data exceeds the storage size of the second memory,
select partial data, based on a usage history or a user input of the electronic device, in case that the size of the designated data exceeds the storage size of the second memory, and
back up the selected partial data as the designated data in the logical storage area.

11. A method for operating an electronic device comprising first memory and second memory having storage characteristic different from that of the first memory, the method comprising:
generating, by the electronic device, a logical storage area in a data area of the first memory;
storing, by the electronic device, designated data in the logical storage area;
entering, by the electronic device, a recovery mode;
storing, by the electronic device, metadata corresponding to the logical storage area in a designated area of the first memory;
in response to entering the recovery mode, mounting, by the electronic device, the logical storage area based on the metadata;
storing, by the electronic device, the data stored in the logical storage area in the second memory;
formatting, by the electronic device, the first memory; and
moving, by the electronic device, the data stored in the second memory to the data area of the first memory.

12. The method of claim 11,
wherein the first memory is configured to be non-volatile memory, and
wherein the second memory is configured to be volatile memory.

13. The method of claim 11, wherein the generating comprises based on execution of the recovery mode being requested, generating the logical storage area.

14. The method of claim 11, further comprising at least one of:
determining, by the electronic device, the designated data based on a usage history of the electronic device;
receiving, by the electronic device, a selection of the designated data from a user in response to data being stored; or
based on the recovery mode being executed, receiving, by the electronic device, a selection of the designated data from the user.

15. The method of claim 11, wherein the storing of the metadata comprises:
encrypting, by the electronic device, the metadata and storing the encrypted metadata in the designated area; or
storing, by the electronic device, the metadata in an encrypted space of the designated area without encrypting the metadata.

16. The method of claim 11,
wherein the designated area includes read/write (R/W) format storage characteristic while the electronic device is in a normal operation mode, and
wherein the data area includes R/W format storage characteristic while the electronic device is in the normal operation mode and has storage characteristic in which the data area is not mounted as a file system based on the electronic device being in the recovery mode.

17. The method of claim 11, wherein the moving of the data stored in the second memory to the data area of the first memory comprises:
mounting, by the electronic device, the first memory after formatting the first memory; and
copying, by the electronic device, the designated data stored in the second memory such that the copied data is moved and stored in the data area of the first memory.

18. The method of claim 11, wherein the storing of the data stored in the logical storage area in the second memory comprises:

identifying, by the electronic device, a storage size of the second memory;
determining, by the electronic device, whether a size of the designated data exceeds the storage size of the second memory;
in response to determining that the size of the designated data exceeds the storage size of the second memory, selecting, by the electronic device; and
backing up, by the electronic device, the selected partial data as the designated data in the logical storage area.

* * * * *